(12) United States Patent
Sato et al.

(10) Patent No.: US 12,744,168 B2
(45) Date of Patent: Sep. 22, 2026

(54) LIGHT EMITTING DEVICE AND SWITCH DEVICE

(71) Applicant: Valeo Japan Co., Ltd., Saitama (JP)

(72) Inventors: Ayami Sato, Chennai (IN); Vinothkumar Ravi, Chennai (IN); Prithiviraj Vimalkumar, Chennai (IN)

(73) Assignee: Valeo Japan Co., Ltd., Saitama (JP)

( * ) Notice: Subject to any disclaimer, the term of this patent is extended or adjusted under 35 U.S.C. 154(b) by 252 days.

(21) Appl. No.: 18/397,377

(22) Filed: Dec. 27, 2023

(65) Prior Publication Data

US 2024/0212950 A1 Jun. 27, 2024

(30) Foreign Application Priority Data

Dec. 27, 2022 (JP) ................................ 2022-210739

(51) Int. Cl.

*H01H 13/02* (2006.01)
*F21V 8/00* (2006.01)
*H01H 3/12* (2006.01)

(52) U.S. Cl.

CPC ......... *H01H 13/023* (2013.01); *G02B 6/0038* (2013.01); *G02B 6/0068* (2013.01); *H01H 3/12* (2013.01); *H01H 2013/026* (2013.01)

(58) Field of Classification Search

CPC ........... H01H 2003/12; H01H 2009/16; H01H 2009/18; H01H 2009/182; H01H 2013/00; H01H 2013/02; H01H 2013/04; H01H 2013/50; H01H 2013/52; H01H 9/16; H01H 9/161; H01H 9/18; H01H 9/181; H01H 9/182; H01H 13/00; H01H 13/02; H01H 13/023; H01H 13/14; H01H 13/26; H01H 13/50; H01H 13/52; H01H 13/70;

(Continued)

(56) References Cited

U.S. PATENT DOCUMENTS 11,513,274 B2 * 11/2022 Nichol ................ G02B 6/0076
2006/0108210 A1 5/2006 Katayama et al.

(Continued)

FOREIGN PATENT DOCUMENTS

| | | |
|---|---|---|
| CN | 104347295 A | 2/2015 |
| JP | H05314855 A | 11/1993 |
| JP | H7-230024 A | 8/1995 |

(Continued)

OTHER PUBLICATIONS

Office Action issued in corresponding JP application No. 2022-210739, dated Apr. 15, 2025 (9 Pages with English Translation).

*Primary Examiner* — Anthony R Jimenez
(74) *Attorney, Agent, or Firm* — Osha Bergman Watanabe & Burton LLP

(57) ABSTRACT

A light emitting device includes at least two light sources arranged side by side in a first direction and a light guide placed opposed to the light sources. As viewed in an opposing direction of the light sources and the light guide, a light receiving surface of the light guide overlaps light emitting surfaces of the light sources. As viewed in the opposing direction, the light receiving surface has depressions in a region opposed to the light emitting surfaces of the light sources. The depressions are arranged side by side in an arrangement direction of the light sources in a one-to-one correspondence with the light sources.

8 Claims, 12 Drawing Sheets

(58) Field of Classification Search
CPC ...... H01H 3/12; H01H 2013/026; H01H 3/00; H01H 3/02; F21V 8/00
USPC ........................................................ 200/314
See application file for complete search history.

(56) References Cited

U.S. PATENT DOCUMENTS

| | | | |
|---|---|---|---|
| 2010/0314229 | A1 | 12/2010 | Ominato |
| 2015/0043192 | A1 | 2/2015 | Tanoue et al. |

FOREIGN PATENT DOCUMENTS

| | | | |
|---|---|---|---|
| JP | H9-306277 | A | 11/1997 |
| JP | H01088903 | A | 4/1998 |
| JP | 2005085506 | A | 3/2005 |
| JP | 2006147498 | A | 6/2006 |
| JP | 2008186716 | A | 8/2008 |
| JP | 2009054454 | A | 3/2009 |
| JP | 2009123662 | A | 6/2009 |
| JP | 2010287381 | A | 12/2010 |
| JP | 2015035396 | A | 2/2015 |
| JP | 2016-162714 | A | 9/2016 |
| JP | 2017-91928 | A | 5/2017 |
| JP | 2021012833 | A | 2/2021 |
| JP | 2022-53395 | A | 4/2022 |

* cited by examiner

LIGHT EMITTING DEVICE AND SWITCH DEVICE

BACKGROUND OF THE INVENTION

1. Field of the Invention

The present invention relates to a light emitting device and a switch device.

2. Description of the Related Art

Patent Literature 1 discloses a light guide device capable of uniformly illuminating a key top.

Patent Literature 1: JP-A-2017-91928

This light guide device forms a part of a switch device that includes, as main parts, an operation button to be operated by a user and a light guide for guiding light from a light source to the key top of the operation button.

In the switch device, a printed circuit board is arranged in an orientation perpendicular to the operating direction of the operation button. A light guide extending toward the printed circuit board is provided inside the key top. The lower end surface of the light guide is opposed to one light source provided on the printed circuit board.

When a key top is illuminated by two light sources arranged side by side on a printed circuit board, the brightness of the illumination section of the key top may become uneven.

As such, there is a need for the capability of limiting unevenness in brightness of the illumination section when a key top is illuminated using two light sources arranged on a printed circuit board and one light guide.

SUMMARY OF THE INVENTION

The present invention is directed to a light emitting device including:

- at least two light sources arranged side by side in a first direction; and
- a light guide placed opposed to the light sources, wherein
- as viewed in an opposing direction of the light sources and the light guide, a light receiving surface of the light guide overlaps light emitting surfaces of the light sources,
- as viewed in the opposing direction, the light receiving surface has depressions in a region opposed to the light emitting surfaces of the light sources, and
- the depressions are arranged side by side in the first direction in a one-to-one correspondence with the light sources.

According to the present invention, it is possible to limit unevenness in brightness of an illumination section.

BRIEF DESCRIPTION OF THE DRAWINGS

FIGS. 7A, 7B, 7C, and 7D are diagrams illustrating a light guide;

DESCRIPTION OF THE PREFERRED EMBODIMENTS

Hereinafter, an embodiment of the present invention is described using an application to a vehicle switch device 1 as an example.

Figure 1:
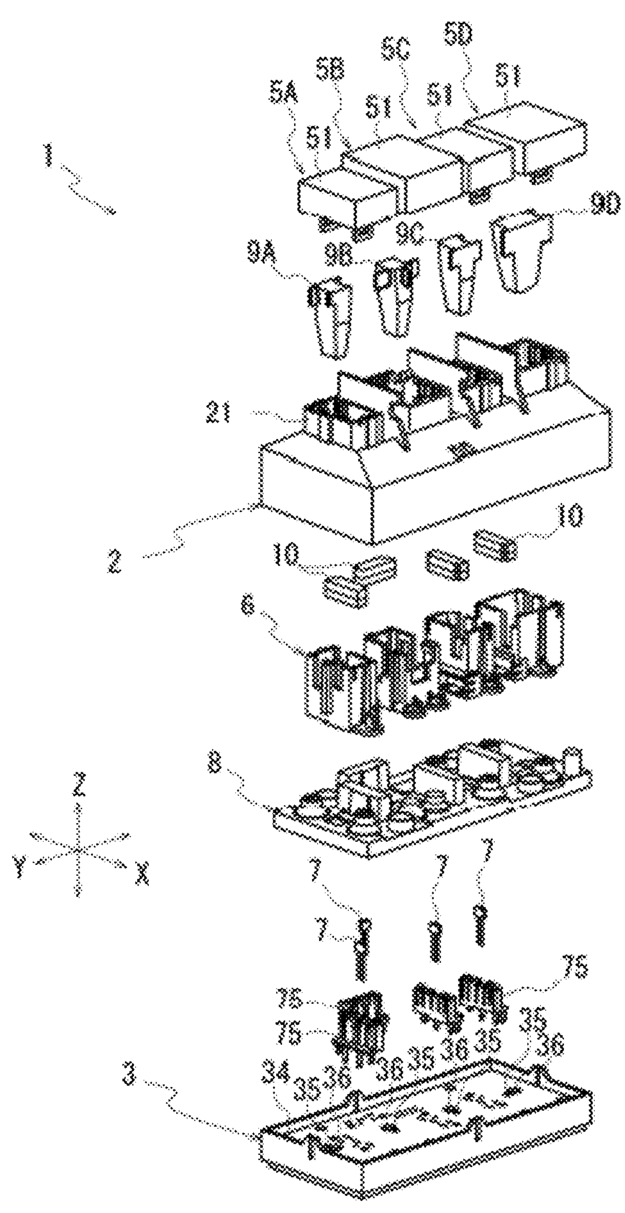
FIG. 1 is an exploded perspective view of a switch device.
Figure 2:
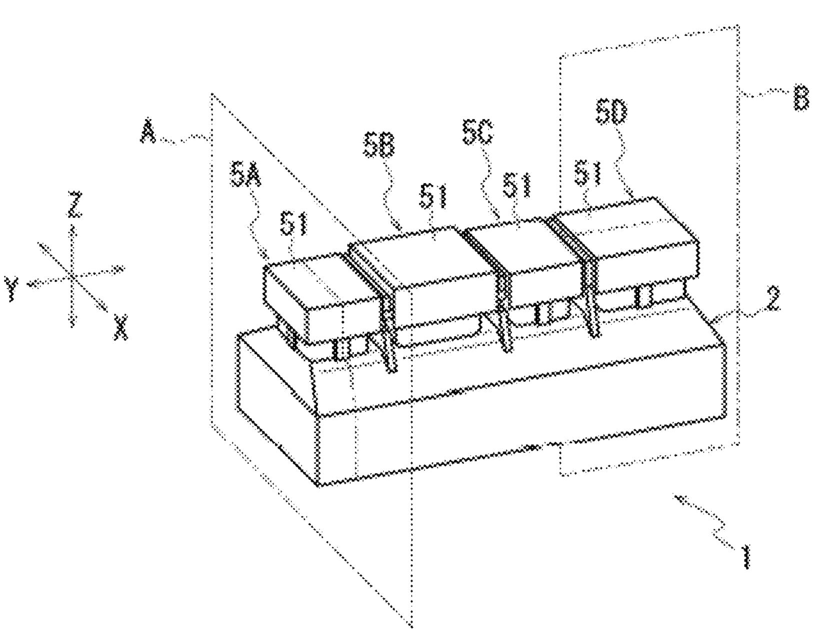
FIG. 2 is a perspective view of the switch device.
Figures 3A, 3B:
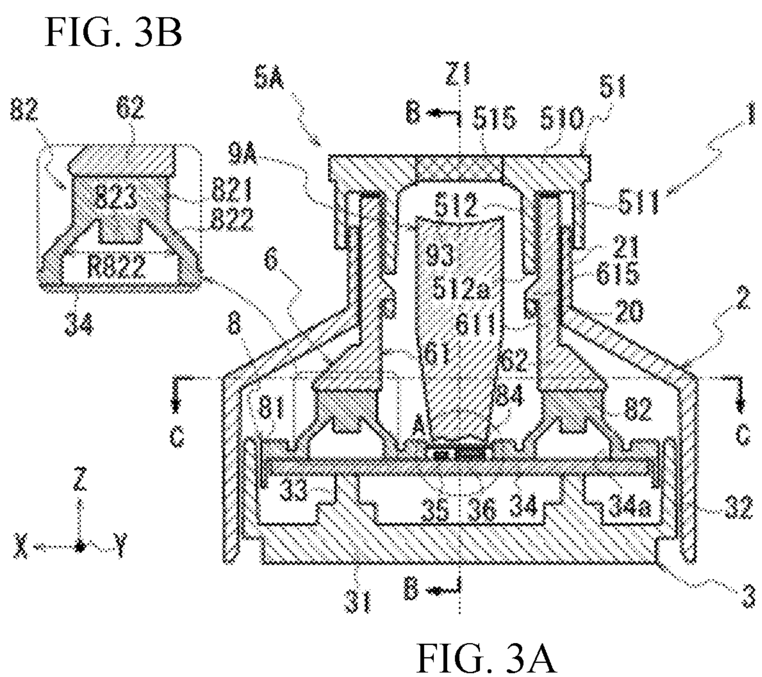
FIG. 3A is a cross-sectional view of the switch device.
FIG. 3B is a cross-sectional view of a stopper portion of the switch device.

FIG. 1 is an exploded perspective view of the switch device 1. FIG. 2 is a perspective view of the switch device 1. FIG. 3 is a cross-sectional view of the switch device 1. FIG. 3 is a diagram schematically showing a cross section of a switch 5A of the switch device 1 taken along plane A in FIG. 2.

Figure 4:
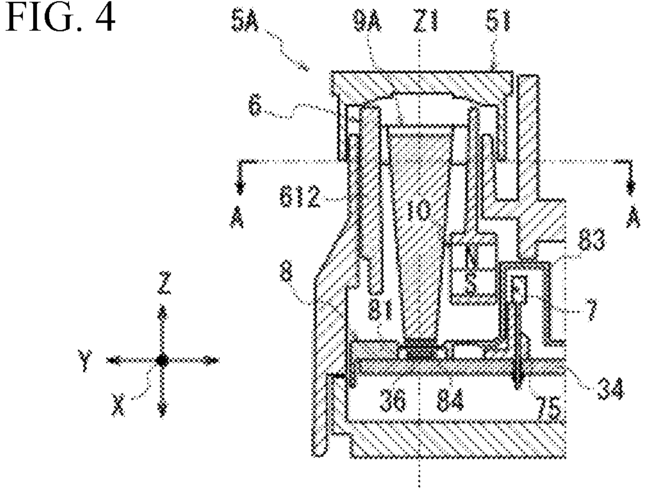
FIG. 4 is a cross-sectional view of the switch device.

FIG. 4 is a cross-sectional view of the switch device 1. FIG. 4 is a diagram schematically showing a cross section of the switch 5A taken along line B-B in FIG. 3.

In the following description, the positional relationship of components of the switch device 1 is described with reference to the XYZ directions in FIG. 1. To describe the positional relationship of components, the terms "upper" and "lower" are used where necessary with reference to up-down directions in Z directions shown in FIG. 1.

As shown in FIG. 2, the switch device 1 includes four switches 5 (5A to 5D) in total.

Operable portions 51 of the respective switches 5 (5A to 5D) are exposed from the upper portion of a case 2.

Mutually different functions are assigned to the switches 5 (5A to 5D).

In one example, when the switch device 1 is used to designate the driving mode of the vehicle, functions such as park (P), reverse driving (R), neutral (N), and forward driving (D) are assigned to these switches 5A to 5D in a one-to-one correspondence.

In the switch device 1, when one of the switches 5A to 5D is pressed, the function assigned to the pressed switch 5 is designated, and the designation of the previously designated function ends.

As shown in FIG. 3, the switch 5A includes an operable portion 51 to be operated by a user, a movable member 6, which is displaced in synchronization with an operation on the operable portion 51, a light guide 9A, which is arranged inside the movable member 6, and light sources 35 and 36 arranged on a printed circuit board 34.

Referring to FIG. 1, the light guides 9 (9A to 9D) are made of a resin material such as polycarbonate. One light guide 9 (9A to 9D) is prepared for each switch 5 (5A to 5D). Also, one light source 35 and one light source 36 are prepared for each switch 5 (5A to 5D). In this embodiment, a pair of light sources 35 and 36 are provided for each of the switches 5A, 5B, 5C, and 5D. The light sources 35 and 36 on the printed circuit board 34 are arranged in the width direction of the light guides 9A, 9B, 9C, and 9D at positions opposed to the light guides 9A, 9B, 9C, and 9D of the respective switches 5A, 5B, 5C, and 5D.

In the following description, the switches 5A, 5B, 5C, and 5D and the light guides 9A, 9B, 9C, and 9D are simply referred to as the switches 5 and the light guides 9 unless they are particularly distinguished.

As shown in FIG. 4, the switch 5A further includes a magnet 10, which is attached to the movable member 6, and a magnetic force sensor 7 (Hall IC: detection element), which detects changes in the magnetic force of the magnet 10 caused by displacement of the movable member 6.

The printed circuit board 34 is shared by the four switches 5 (5A to 5D). As such, four supports 75 for supporting the magnetic force sensors 7 are provided on the printed circuit board 34.

A switch 5 (5A to 5D), a light guide 9 (9A to 9D), and light sources 35 and 36 form a light emitting device 11 according to the invention.

As shown in FIG. 3, the printed circuit board 34 is housed in a cover 3, which closes the lower opening of the case 2. As shown in FIG. 3, the cover 3 has a bottom wall portion 31 and a peripheral wall portion 32 surrounding the entire outer periphery of the bottom wall portion 31. The peripheral wall portion 32 is provided in an orientation substantially perpendicular to the bottom wall portion 31. The peripheral wall portion 32 is formed to have the same height over the entire periphery in the peripheral direction.

The cover 3 is attached to the case 2 with screws (not shown) with the peripheral wall portion 32 fitted in the lower opening of the case 2.

Support bases 33 for the printed circuit board 34 are provided inside the peripheral wall portion 32. The support bases 33 project in the same direction as the peripheral wall portion 32. The bottom wall portion 31 has multiple support bases 33. The printed circuit board 34 is placed on the upper ends of the support bases 33.

As shown in FIG. 3, a cover member 8 made of an elastic material is placed on the printed circuit board 34.

As shown in FIG. 1, the switches 5A, 5C, and 5D are push type switches and have the same basic configuration. The switch 5B is a swing switch. The switch 5D has the same basic configuration as the switch 5A, but the width of the light guide 9D, which will be described below, is larger than the width of the light guide 9A of the switch 5A.

Hereinafter, the basic configuration of the switch 5A, which typifies the push type switches, is described.

As shown in FIG. 3, the operable portion 51 (operator) of the switch 5A includes a pressing target portion 510 (key top), a peripheral wall portion 511, which surrounds the entire periphery of the pressing target portion 510, and coupling portions 512, which are located inward of the peripheral wall portion 511 and extend in the same direction as the peripheral wall portion 511.

The upper surface of the pressing target portion 510 has a central region serving as an illumination section 515. The back side of the illumination section 515 (the lower side as viewed in the figure) corresponding to the printed circuit board 34 receives light emitted from the light sources 35 and 36 through the light guide 9A. An identifier (mark) is provided on the upper surface of the illumination section 515 to allow visual recognition of the function assigned to the switch 5A. The part of the identifier in the illumination region allows light to pass therethrough, improving the visibility and the design of the identifier when illuminated with illumination light.

A through hole 20 is provided in the upper portion of the case 2 to provide communication between the inside and the outside of the case 2. A peripheral wall portion 21 surrounding the through hole 20 is provided in the upper portion of the case 2. The peripheral wall portion 21 extends linearly upward away from the printed circuit board 34. The peripheral wall portion 511 of the operable portion 51 is fitted to the outer side of the peripheral wall portion 21 of the case 2. Also, a peripheral wall portion 61 (first wall portion 611) of the movable member 6 extends through the inside of the peripheral wall portion 21 of the case 2 in the direction of an axis Z1. The axis Z1 is a straight line perpendicular to the upper surface 34*a* of the printed circuit board 34 and extending in the displacement direction of the movable member 6.

The movable member 6 is supported by the peripheral wall portion 21 of the case 2 so as to be movable in the directions of the axis Z1. The coupling portions 512 of the operable portion 51 are inserted into the peripheral wall portion 61 (second wall portion 612) of the movable member 6. Projections 615 extending from the inner periphery of the peripheral wall portion 61 (second wall portion 612) are engaged with engagement holes 512*a* in the distal end sides of the coupling portions 512. In this embodiment, the projections 615 of the movable member 6 engage with the engagement holes 512*a* to couple the operable portion 51 and the movable member 6. This allows the movable member 6 to be displaced in the direction of the axis Z1 in synchronization with a pressing operation on the operable portion 51.

Figure 5:
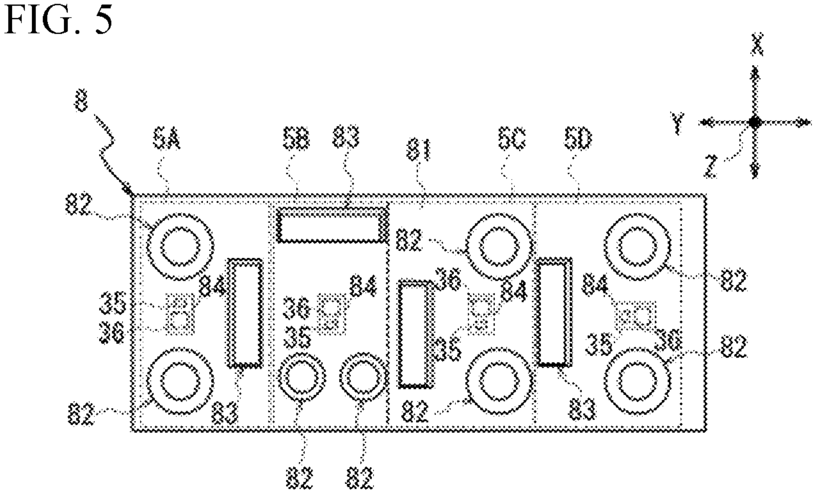
FIG. 5 is a diagram illustrating a cover member.

FIG. 5 is a schematic view of the cover member 8 as viewed from the side corresponding to the case 2. For convenience of explanation, FIG. 5 is a simplified illustration in which detailed projections and depressions of the surface of the cover member 8 are omitted. Also, in FIG. 5, to illustrate the correspondence between the sections projecting from a base portion 81 (mount portions 82, housing portions 83) and the switches 5A to 5D, the sections (mount portions 82, housing portions 83) corresponding to the respective switches 5A to 5D are individually surrounded by broken lines.

As shown in FIG. 5, the cover member 8 includes the base portion 81, mount portions 82, housing portions 83, and light transmitting regions 84. The cover member 8 is an integral component made of a flexible elastic material such as rubber. The cover member 8 is sized to cover the entire upper surface of the printed circuit board 34.

The base portion 81 is a section that is placed on the printed circuit board 34 (see FIG. 3). The mount portions 82 are sections that support the movable members 6 so as to allow displacement in the directions of the axis Z1 (up-down directions as viewed in the figure) (see FIG. 3). The housing portions 83 are sections each housing a magnetic force sensor 7 and a support 75 (see FIG. 4). The light transmitting regions 84 are sections formed to be thinner than other section. The light transmitting regions 84 are positioned above the light sources 35 and 36 on the printed circuit board 34. The light transmitting regions 84 are formed to have a thickness that allows light to pass therethrough while limiting a decrease in the intensity of light emitted from the light sources 35 and 36.

As shown in FIG. 5, in the cover member 8, a pair of mount portions 82 and 82, one housing portion 83, and one light transmitting region 84 are assigned to each switch. In the figure, the mount portions 82 and 82, the housing portion 83, and the light transmitting region 84 within the area surrounded by the dashed line designated by 5A are the sections for the switch 5A. In the figure, the mount portions 82 and 82, the housing portion 83, and the light transmitting region 84 within the area surrounded by the dashed line designated by 5D are the sections for the switch 5D.

As indicated by hidden lines in FIG. 5, the light sources 35 and 36 are positioned rearward of the light transmitting regions 84 as viewed in FIG. 5. The light sources 35 and 36 of each of the switches 5A to 5C are arranged side by side in the up-down direction (X direction) as viewed in the figure. The light sources 35 and 36 of the switch 5D are arranged side by side in the right-left direction (Y direction) as viewed in the figure.

As shown in FIG. 3, the light sources 35 and 36 may be LEDs, for example. The light sources 35 and 36 are arranged with their light emitting surfaces facing upward. In this embodiment, the wavelength of the light emitted by the light source 35 differs from the wavelength of the light emitted by the light source 36. In one example, the light source 35 emits white light, while the light source 36 emits orange light.

As shown in FIG. 3, the light guide 9A is located on the opposite side of the light transmitting region 84 from the printed circuit board 34. A light receiving surface 94 (incident surface) of the light guide 9A is placed opposed to the light emitting surfaces of the light sources 35 and 36 with the light transmitting region 84 interposed therebetween (see FIG. 8A).

As shown in FIG. 3, the mount portions 82 each include a columnar contact portion 821, a support wall portion 822, which surrounds the entire outer circumference of the contact portion 821, and a stopper portion 823 connected to the lower end of the contact portion 821.

The contact portion 62 of the movable member 6 is placed on the upper end of the contact portion 821. The stopper portion 823 is a columnar section arranged concentrically with the contact portion 821. The stopper portion 823 is formed to have a smaller outer diameter than the contact portion 821.

The support wall portion 822 extends toward the printed circuit board 34 from the boundary section between the contact portion 821 and the stopper portion 823. The support wall portion 822 connects the contact portion 821 and the base portion 81. The support wall portion 822 is inclined such that its inner diameter R822 is larger at locations farther from the contact portion 821 and closer to the printed circuit board 34. The support wall portion 822 holds the contact portion 821 at a position spaced apart from the printed circuit board 34.

When an operating force directed toward the printed circuit board 34 is input to the movable member 6, the contact portion 821 of the mount portion 82 pressed by the contact portion 62 is displaced toward the printed circuit board 34 while deforming the support wall portion 822. The contact portion 821 is displaced toward the printed circuit board 34 until the stopper portion 823 comes into contact with the printed circuit board 34. The sections of the contact portion 821 and the printed circuit board 34 that face each other have contacts. When the contact portion 821 is brought into contact with the printed circuit board 34, the switch 5A is turned on.

When the operating force acting on the movable member 6 is released, the restoring force of the support wall portion 822 displaces the mount portion 82 in a direction away from the printed circuit board 34

The support wall portion 822 applies an urging force to the movable member 6 placed on the mount portion 82 in a direction that returns the movable member 6 to the initial position before displacement.

In the present embodiment, the movable member 6, which is displaced in the direction of axis Z1 in synchronization with an operation on the operable portion 51 is mounted on the mount portions 82 and 82. This allows the user to feel the operating feeling (reaction force) when operating and pressing the operable portion 51.

Figure 6:
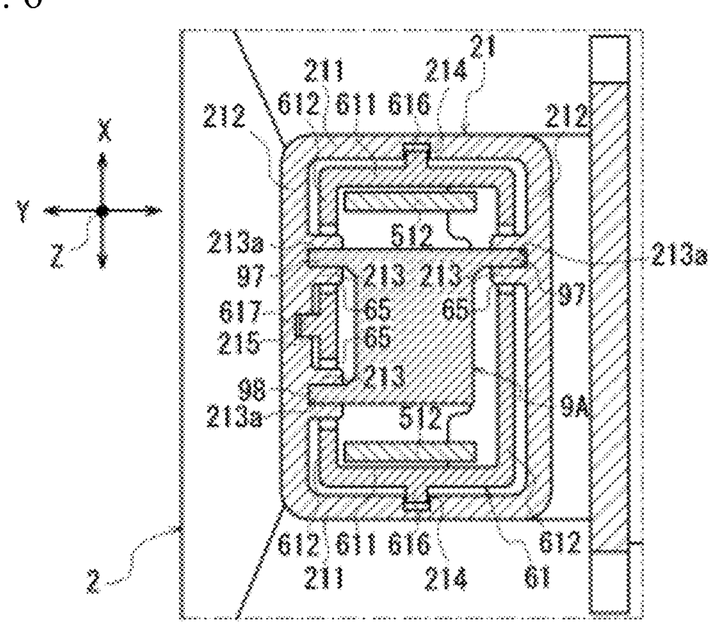
FIG. 6 is a cross-sectional view of the switch device.

FIG. 6 is a cross-sectional view of the switch device 1. FIG. 6 is a cross-sectional view of a portion of the switch 5A taken along line A-A in FIG. 4.

Figures 7A, 7C, 7D:
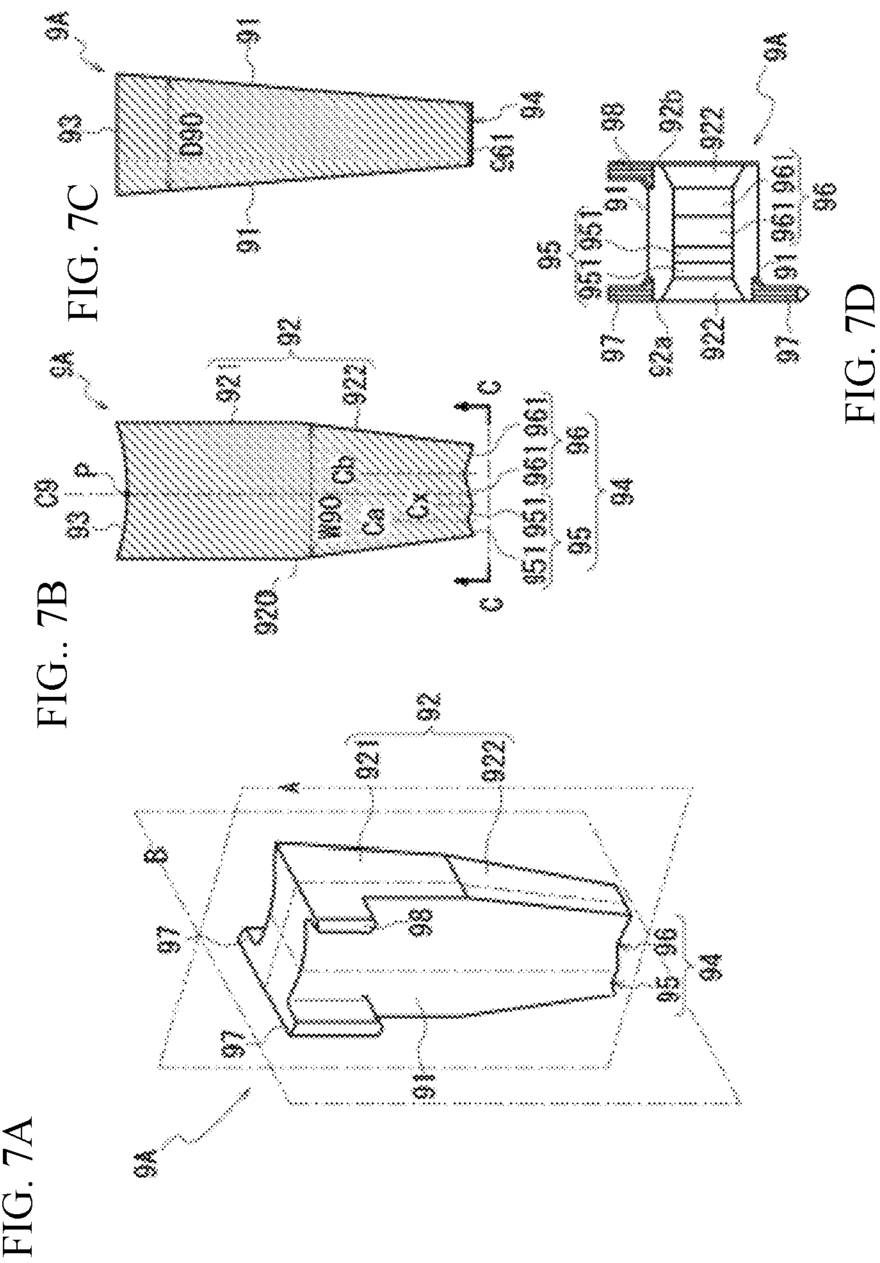

FIGS. 7A to 7D are diagrams illustrating the light guide 9A. FIG. 7A is a perspective view of the light guide 9A. FIG. 7B is a cross-sectional view of the light guide 9A taken along plane A in FIG. 7A. FIG. 7C is a cross-sectional view of the light guide 9A taken along plane B in FIG. 7A. FIG. 7D is a plan view of the light guide 9A as viewed in the direction of arrows C-C in FIG. 7B.

Figure 8A:
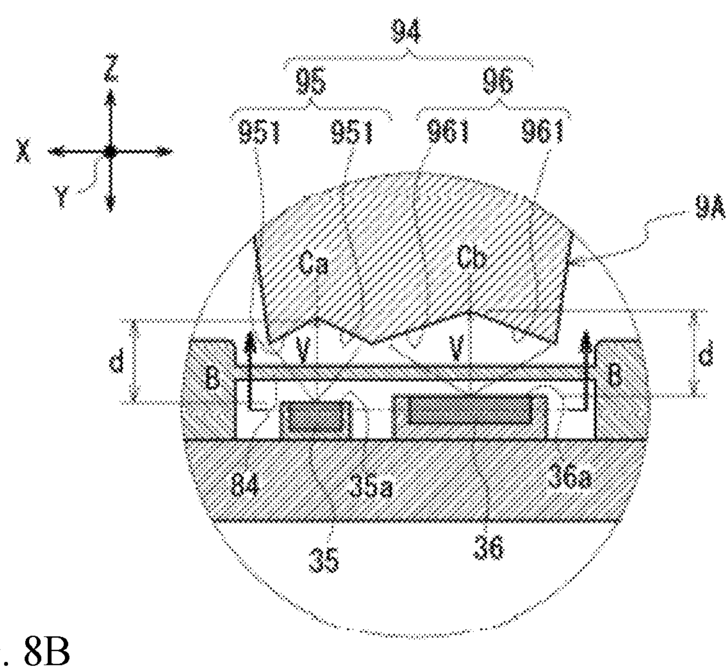
FIGS. 8A and 8B are diagrams illustrating the positional relationship of the light guide and light sources.
Figure 8B:
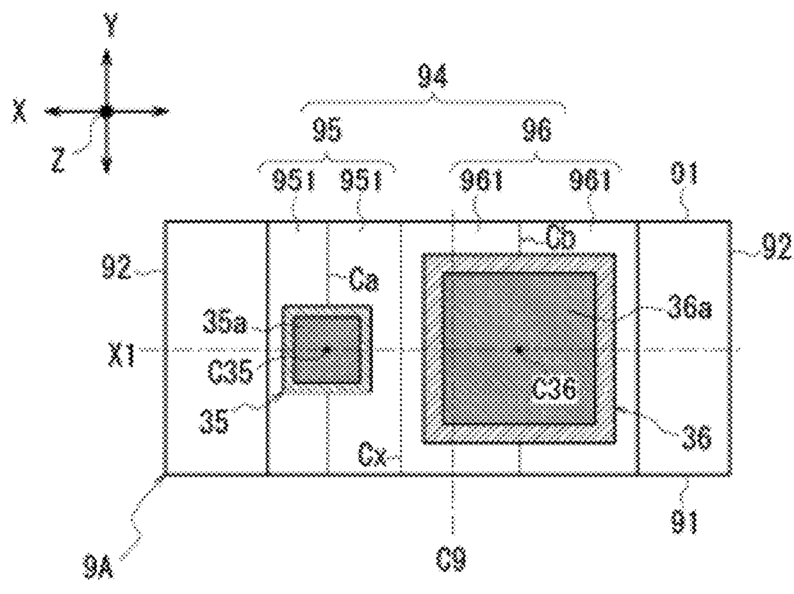

FIGS. 8A and 8B are diagrams illustrating the positional relationship between the light guide 9A and the light sources 35 and 36. FIG. 8A is an enlarged view of region A in FIG. 3. FIG. 8B is a cross-sectional view taken along line B-B in FIG. 8A. The illustration of the cover member 8 is omitted in FIG. 8B.

As shown in FIG. 3, the light guide 9A of the switch 5A is provided inside the movable member 6 along the axis Z1.

As shown in FIG. 8B, the light guide 9A has a substantially rectangular shape when viewed from below. The light guide 9A is oriented such that the side surfaces 91 and 91 of the longer sides extend in the arrangement direction of the light sources 35 and 36 (X direction).

As shown in FIG. 7B, the lower end of the light guide 9A is a light receiving surface 94 (incident surface) for the light emitted from the light sources 35 and 36, and the upper end is a light emitting surface 93 (exit surface) for the light that has entered the light guide 9A from the light receiving surface 94.

As shown in FIG. 7C, the side surfaces 91 and 91 of the light guide 9A are inclined toward each other from the light emitting surface 93 toward the light receiving surface 94.

The thickness D90 of the light guide 9A in a direction perpendicular to the side surfaces 91 decreases toward the light receiving surface 94.

As shown in FIG. 7B, side surfaces 92 and 92 of the light guide 9A consist of first side surfaces 921 parallel to the center line C9 and second side surfaces 922 inclined so as to be closer to each other at locations closer to the light receiving surface 94. The first side surfaces 921 are located on the side corresponding to the light emitting surface 93. The second side surfaces 922 are located on the side corresponding to the light receiving surface 94.

The thickness W90 of the light guide 9A in a direction along the side surfaces 91 changes at a boundary point 920 between the first side surface 921 and the second side surface 922. In a cross-sectional view along the second side surface 922, the thickness W90 of the section corresponding to the second side surfaces 922 decreases toward the light receiving surface 94.

As shown in FIGS. 7A and 7D, the light guide 9A includes retention tabs 97, 97, and 98 at the sides of the side surfaces 92 and 92 corresponding to the light emitting surface 93. As shown in FIG. 7D, the retention tabs 97 and 97 extend from one side surface 92*a* away from each other. The retention tab 98 extends from the other side surface 92*b* and is parallel to the retention tabs 97.

As shown in FIG. 6, the light guide 9A is set with the retention tabs 97, 97, and 98 retained by engagement portions 213, 213, and 213 provided on the peripheral wall portion 21 of the case 2.

The peripheral wall portion 21 is formed in a tubular shape by a pair of first wall portions 211 and 211 and second wall portions 212 and 212, which connect edges of the first wall portions 211 and 211 to each other. The peripheral wall portion 21 has a substantially rectangular outer shape in cross-sectional view.

One of the second wall portions 212 that is located on the left side as viewed in the figure has two engagement portions 213 and 213 spaced apart in the longitudinal direction (X direction) of the second wall portion 212. The other second wall portion 212 on the right side as viewed in the figure has one engagement portion 213. These engagement portions 213 project from the inner peripheries of the second wall portions 212. Each engagement portion 213 has a recess 213*a* opening inward.

The retention tabs 97 and 98 of the light guide 9A engage with the two engagement portions 213 and 213 of one of the second wall portions 212 from the Z direction. The retention tab 97 of the light guide 9A engages with one engagement portion 213 of the other second wall portion 212 from the Z direction.

In this state, the light guide 9A is positioned by the peripheral wall portion 21 in a state in which the displacement relative to the peripheral wall portion 21 is restricted.

The inner peripheries of the first wall portions 211 and 211 have guide grooves 214 and 214 in their central portions in the longitudinal direction (Y direction). The inner periphery of one of the second wall portions 212 has a guide groove 215 in its central portion in the longitudinal direction (X direction). These guide grooves 214, 214, and 215 are formed to have predetermined extents in the Z direction.

The peripheral wall portion 61 of the movable member 6 is located inside the peripheral wall portion 21. Guides 616, 616, and 617 of the movable member 6 are engaged with the guide grooves 214, 214, and 215 from the Z direction. In this state, the movable member 6 is allowed to be displaced relative to the peripheral wall portion 21 in the Z directions. When the movable member 6 is displaced in a Z direction in synchronization with a pressing operation on the operable portion 51 of the switch 5A, the displacement of the movable member 6 in the Z direction is guided by the guides 616, 616, and 617 engaging with the guide grooves 214, 214, and 215.

The peripheral wall portion 61 of the movable member 6 is formed in a tubular shape by a pair of first wall portions 611 and 611 and second wall portions 612 and 612, which connect edges of the first wall portions 611 and 611 to each other. The peripheral wall portion 61 has a substantially rectangular outer shape in cross-sectional view.

The peripheral wall portion 61 has cutout sections 65 provided at positions aligned with the engagement portions 213, 213, and 213 as viewed in the Z direction. The retention tabs 97, 97, and 98 of the light guide 9A are engaged with the engagement portions 213, 213, and 213 at positions aligned with the cutout sections 65 as viewed in the Z direction.

As shown in FIG. 7B, the light emitting surface 93 of the light guide 9A is formed in a concave shape that is recessed downward toward the light receiving surface 94. The light emitting surface 93 is preferably formed to have the shape of an arc with an apex P oriented downward in cross-sectional view, for example. With this arc-shaped light emitting surface 93, the apex P of the arc is positioned on the center line C9 of the light guide 9A. The shape of the light emitting surface 93 is not limited to an arc shape. For example, it may be V-shaped with the apex facing downward.

As shown in FIG. 8A, the light receiving surface 94 consists of two depressions 95 and 96 recessed toward the light emitting surface 93. The depressions 95 and 96 are arranged in the arrangement direction of the light sources 35 and 36 (X direction).

The depression 95 is placed opposed to the light source 35. The depression 95 includes a pair of inclined surfaces 951 and 951. With the pair of inclined surfaces 951 and 951, the distance d from the light emitting surface 35*a* of the light source 35 changes continuously in the arrangement direction of the light sources 35 and 36 (X direction).

As shown in FIG. 8B, when viewed from the opposing direction of the light guide 9A and the light source 35 (Z direction), the pair of inclined surfaces 951 and 951 are adjacent to each other in the arrangement direction of the light sources 35 and 36 (X direction).

The light guide 9A is positioned such that the boundary line Ca between the pair of inclined surfaces 951 and 951 is located at a position overlapping the light emitting surface 35*a* of the light source 35, more preferably at a position intersecting the center C35 of the light emitting surface 35*a*.

In this state, when viewed in the opposing direction of the light guide 9A and the light source 35 (Z direction), the light source 35 is provided in such a positional relationship that the light source 35 entirely coincides with the depression 95.

The boundary line Ca between the inclined surfaces 951 and 951 is perpendicular to a straight line X1. The straight line X1 extends in the arrangement direction of the light sources 35 and 36 (X direction) and passes through the centers C35 and C36 of the light sources 35 and 36.

In the depression 95, the section of the boundary line Ca has the maximum distance d from the light emitting surface 35*a* of the light source 35. Also, the inclined surfaces 951 and 951 are inclined in such orientations that the distance d from the light emitting surface 35*a* is shorter at locations farther from the boundary line Ca in the arrangement direction of the light sources 35 and 36 (X direction).

The depression 96 is placed opposed to the light source 36. The depression 96 has a pair of inclined surfaces 961 and 961. In the pair of inclined surfaces 961 and 961, the distance d from the light emitting surface 36*a* of the light source 36 changes continuously in the arrangement direction of the light sources 35 and 36 (X direction).

As shown in FIG. 8B, when viewed from the opposing direction of the light guide 9A and the light source 36 (Z direction), the pair of inclined surfaces 961 and 961 are adjacent to each other in the arrangement direction of the light sources 35 and 36 (X direction).

The light guide 9A is positioned such that the boundary line Cb between the pair of inclined surfaces 961 and 961 is located at a position overlapping the light emitting surface 36*a* of the light source 36, more preferably at a position intersecting the center C36 of the light emitting surface 36*a*.

In this state, when viewed in the opposing direction of the light guide 9A and the light source 36 (Z direction), the light source 36 is provided in such a positional relationship that the light source 36 entirely coincides with the depression 96.

The boundary line Cb between the inclined surfaces 961 and 961 is perpendicular to a straight line X1. In the depression 96, the section of the boundary line Cb has the maximum distance d from the light emitting surface 36*a* of the light source 36. Also, the inclined surfaces 961 and 961 are inclined in such orientations that the distance d from the light emitting surface 36*a* is shorter at locations farther from the boundary line Cb in the arrangement direction of the light sources 35 and 36 (X direction).

As shown in FIG. 8B, the boundary line Cx between an inclined surface 951 of the depression 95 and an inclined surface 961 of the depression 96 is closer to the light source 35 than a straight line C9 extending through the center of the light receiving surface 94 in the arrangement direction of the light sources 35 and 36 (X direction). In the light receiving surface 94, the surface opposed to the light sources 35 and 36 includes protrusions and depressions with pointed shapes arranged continuously in the arrangement direction of the light sources 35 and 36 (X direction). Thus, in the present embodiment, the section of the light receiving surface 94 opposed to the light sources 35 and 36 does not have a flat surface parallel to the light emitting surfaces 35*a* and 36*a* of the light sources 35 and 36, but the shape of the light receiving surface is not limited to this mode. Depending on the area or the like of the light sources 35 and 36, a flat surface may be provided between the depressions 95 and 96.

When the light source 35 emits white light and the light source 36 emits orange light, for example, at least a partial region of the inclined surfaces 961 and 961 has been subjected to light diffusion processing such as texturing.

When two light sources of different colors are arranged side by side, the brightness of the light actually emitted from each light source needs to match the brightness required for the light source. As described above, by processing the inclined surfaces 961 and 961 of the depression opposed to the light source whose brightness needs to be reduced, the final brightness required for each light source can be easily adjusted.

As shown in FIG. 1, the light guides 9B and 9C have the same basic configuration as the light guide 9A, except that the retention tabs are arranged differently.

That is, the light guides 9B and 9C each have two depressions 95 and 96, which are arranged in the arrangement direction of the light sources 35 and 36 in the light receiving surface 94, and the light emitting surface 93, which is recessed in a concave shape.

Figure 9:
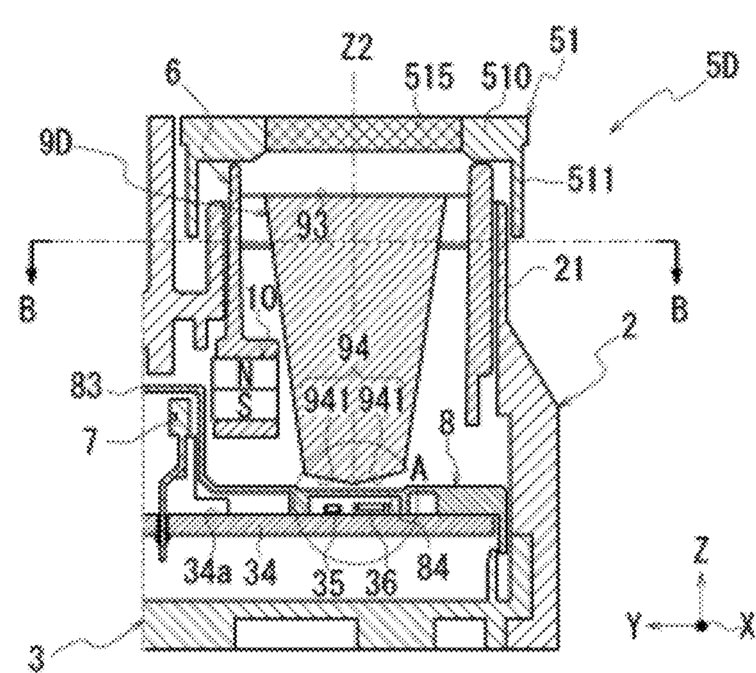
FIG. 9 is a cross-sectional view of the switch device.

FIG. 9 is a cross-sectional view of the switch device 1. FIG. 9 is a diagram schematically showing a cross section of the switch 5D of the switch device 1 taken along plane B in FIG. 2.

Figure 10:
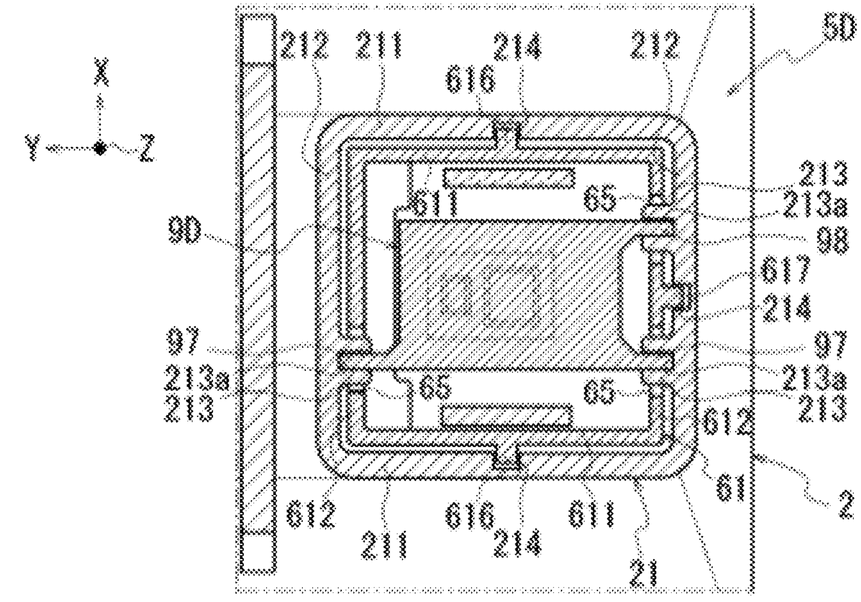
FIG. 10 is a cross-sectional view of the switch device.

FIG. 10 is a cross-sectional view of the switch device 1. FIG. 10 is a diagram schematically showing a cross section of the switch 5D of the switch device 1 taken along ling B-B in FIG. 9.

In also the switch 5D, the peripheral wall portion 61 of the movable member 6 is located inside the tubular peripheral wall portion 21 of the case 2. Engagement portions 213 projecting from the inner periphery of the peripheral wall portion 21 engage with retention tabs 97, 97, and 98 of the light guide 9D at positions aligned with cutout sections 65 of the peripheral wall portion 61.

Figures 11A, 11B, 11C, 11D:
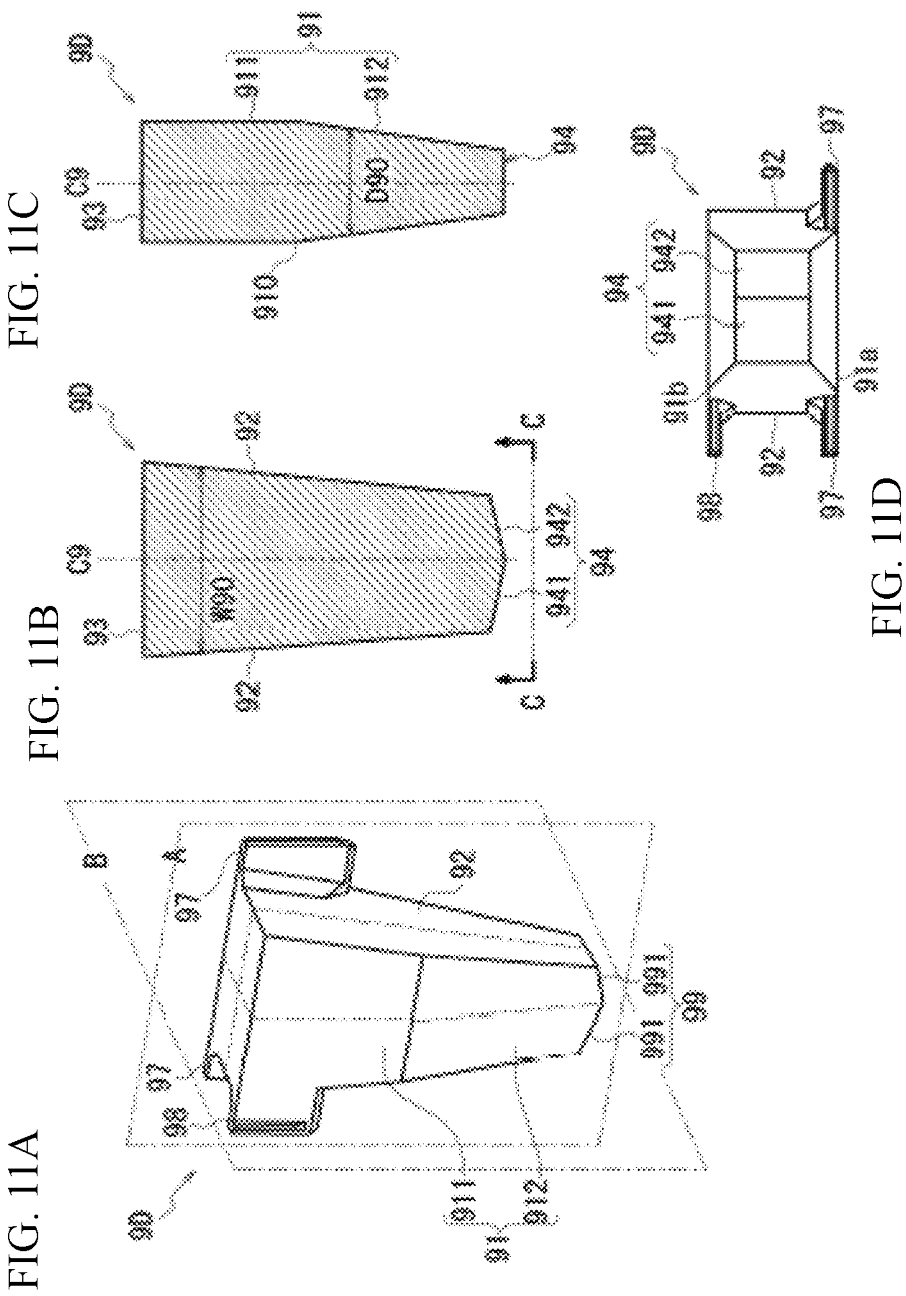
FIGS. 11A, 11B, 11C, and 11D are diagrams illustrating a light guide.

FIGS. 11A to 11D are diagrams illustrating the light guide 9D. FIG. 11A is a perspective view of the light guide 9D. FIG. 11B is a cross-sectional view of the light guide 9D taken along plane A in FIG. 11A. FIG. 11C is a cross-sectional view of the light guide 9D taken along plane B in FIG. 11A. FIG. 11D is a plan view of the light guide 9D as viewed in the direction of arrows C-C in FIG. 11B.

Figures 12A, 12B:
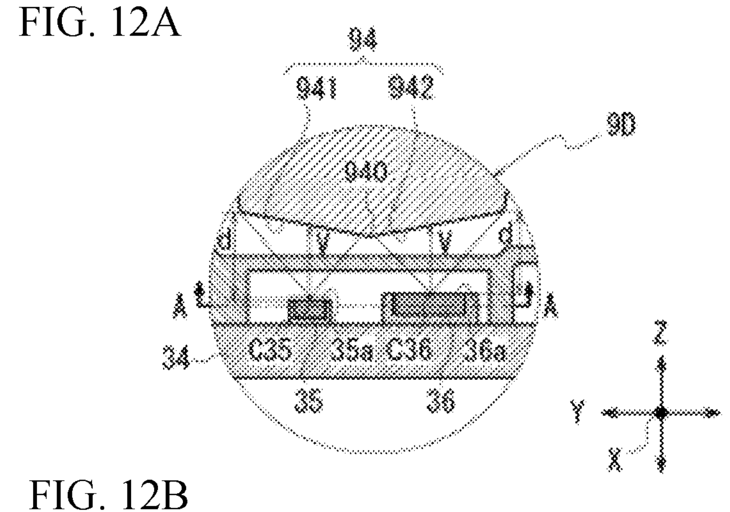
FIGS. 12A and 12B are diagrams illustrating the positional relationship between the light guide and light sources.

FIGS. 12A and 12B are diagrams illustrating the positional relationship between the light guide 9D and the light sources 35 and 36. FIG. 12A is an enlarged view of region A in FIG. 9. FIG. 12B is a cross-sectional view taken along line A-A in FIG. 12A. The illustration of the cover member 8 is omitted in FIG. 12B.

As shown in FIG. 9, the switch 5D differs from the light guide 9A in the shape of the light guide 9D provided therein.

The light guide 9D of the switch 5D is provided inside the movable member 6 along an axis Z2. The axis Z2 is a straight line perpendicular to the upper surface 34*a* of the printed circuit board 34 and extending in the displacement direction of the movable member 6.

As shown in FIG. 9, the light guide 9D of the switch 5D is provided inside the movable member 6 along the axis Z2.

As shown in FIG. 12B, the light guide 9D has a substantially rectangular shape when viewed from below. The light guide 9D is oriented such that the side surfaces 91 and 91 of the longer sides extend in the arrangement direction of the light sources 35 and 36 (Y direction).

As shown in FIG. 11B, the lower end of the light guide 9D is a light receiving surface 94 for the light emitted from the light sources 35 and 36, and the upper end is a light emitting surface 93 for the light that has entered the light guide 9D from the light receiving surface 94.

As shown in FIG. 11B, the side surfaces 92 and 92 of the light guide 9D are inclined toward each other from the light emitting surface 93 toward the light receiving surface 94.

The width W90 of the light guide 9D in a direction along the side surface 91 decreases toward the light receiving surface 94.

As shown in FIG. 11C, side surfaces 91 and 91 of the light guide 9D consist of first side surfaces 911 parallel to the center line C9 and second side surfaces 912 inclined so as to be closer to each other at locations closer to the light receiving surface 94. The first side surfaces 911 are located on the side corresponding to the light emitting surface 93. The second side surfaces 912 are located on the side corresponding to the light receiving surface 94.

The thickness D90 of the light guide 9D in a direction perpendicular to the side surfaces 91 changes at a boundary point 910 between the first side surface 911 and the second side surface 912. In a cross-sectional view along the side surface 91, the thickness D90 of the section corresponding to the second side surfaces 912 decreases toward the light receiving surface 94.

As shown in FIGS. 11A and 11D, the light guide 9D includes retention tabs 97, 97, and 98 at the sides of the side surfaces 91 and 91 corresponding to the light emitting surface 93. As shown in FIG. 11D, the retention tabs 97 and 97 extend from one side surface 91*a* away from each other. The retention tab 98 extends from the other side surface 91*b* and is parallel to the retention tabs 97.

As shown in FIG. 10, the light guide 9D is set with the retention tabs 97, 97, and 98 retained by the engagement portions 213, 213, and 213 provided on the peripheral wall portion 21 of the case 2.

In the peripheral wall portion 21, one of the second wall portions 212 that is located on the left side as viewed in the figure has one engagement portion 213. The other second wall portion 212 that is located on the right side as viewed in the figure has two engagement portions 213 and 213 spaced apart in the longitudinal direction (X direction) of the second wall portion 212. These engagement portions 213 project from the inner peripheries of the second wall portions 212. Each engagement portion 213 has a recess 213*a* opening inward.

The retention tabs 97 and 98 of the light guide 9D engage with the two engagement portions 213 and 213 of the other second wall portion 212 from the Z direction. The retention tab 97 of the light guide 9D engages with one engagement portion 213 of one of the second wall portions 212 from the Z direction.

In this state, the light guide 9D is positioned by the peripheral wall portion 21 in a state in which the displacement relative to the peripheral wall portion 21 is restricted.

The peripheral wall portion 61 of the movable member 6 is located inside the peripheral wall portion 21. Guides 616, 616, and 617 of the movable member 6 are engaged with the guide grooves 214 and 214 from the Z direction. In this state, the movable member 6 is allowed to be displaced relative to the peripheral wall portion 21 in the Z direction. When the movable member 6 is displaced in the Z direction in synchronization with a pressing operation on the operable portion 51 of the switch 5D, the displacement of the movable member 6 in the Z direction is guided by the guides 616, 616, and 617 engaging with the guide grooves 214, 214, and 215.

The peripheral wall portion 61 of the movable member 6 is formed in a tubular shape by a pair of first wall portions 611 and 611 and second wall portions 612 and 612, which connect edges of the first wall portions 611 and 611 to each other. The peripheral wall portion 61 has a substantially rectangular outer shape in cross-sectional view.

The peripheral wall portion 61 has cutout sections 65 provided at positions aligned with the engagement portions 213, 213, and 213 as viewed in the Z direction. The retention tabs 97, 97, and 98 of the light guide 9D are engaged with the engagement portions 213, 213, and 213 at positions aligned with the cutout sections 65 as viewed in the Z direction.

As shown in FIG. 11B, the light emitting surface 93 of the light guide 9D is a flat surface perpendicular to the center line C9. The light receiving surface 94 of the light guide 9D is formed in the shape of a protrusion extending in a direction away from the light emitting surface 93.

The light receiving surface 94 consists of a pair of inclined surfaces 941 and 942. As shown in FIG. 12A, the pair of inclined surfaces 941 and 942 are adjacent in the direction in the arrangement direction of the light sources 35 and 36 (Y direction).

The inclined surface 941 is placed opposed to the light source 35. The distance d of the inclined surface 941 from the light emitting surface 35*a* of the light source 35 changes continuously in the arrangement direction of the light sources 35 and 36 (Y direction). Specifically, the inclined surface 941 is inclined such that the distance d decreases toward the adjacent inclined surface 942 (toward the right side in the figure).

The inclined surface 942 is placed opposed to the light source 36. The distance d of the inclined surface 942 from the light emitting surface 36*a* of the light source 36 changes continuously in the arrangement direction of the light sources 35 and 36 (Y direction). Specifically, the inclined surface 942 is inclined such that the distance d decreases toward the adjacent inclined surface 941 (toward the left side in the figure).

As viewed in the opposing direction of the light guide 9D and the light sources 35 and 36 (Z direction), the light guide 9D is positioned such that the boundary line Cx between the inclined surfaces 941 and 942 is located between the light sources 35 and 36.

In this state, the light guide 9D is preferably positioned such that the center C35 of the light emitting surface 35*a* substantially coincides with the center line C941 of the inclined surface 941 in the Y direction, and that the center C36 of the light emitting surface 36*a* substantially coincides with the center line C942 of the inclined surface 942 in the Y direction.

Here, as shown in FIG. 12A, the light emitted from the light sources 35 and 36 travels from the centers C35 and C36 of the light emitting surfaces 35*a* and 36*a* in directions perpendicular to the light emitting surfaces 35*a* and 36*a* (the direction of the center lines indicated by reference lines V in the figure). At this time, the light emitted from the light sources 35 and 36 is diffused to the surroundings while traveling along the reference lines V.

When the light guide 9D is arranged as described above, the light emitted from the light source 35 enters the light guide 9D from the inclined surface 941, and the light emitted from the light source 36 enters the light guide 9D from the inclined surface 942.

When the light source 35 emits white light and the light source 36 emits orange light, the inclined surface 942 corresponding to the light source 36 has preferably been subjected to light diffusion processing such as texturing.

When two light sources of different colors are arranged side by side, the light sources emit light with different brightness. As such, when the inclined surface 941 on which the brighter light is incident has been subjected to light diffusion processing as described above, it is possible to limit unevenness in brightness of the light that is ultimately emitted from the light guide 9D.

The operations of the light guides 9A and 9D are now described.

FIGS. 13A, 13B, 14A, and 14B are diagrams for illustrating the operations of light guides.

Figures 13A, 13B:
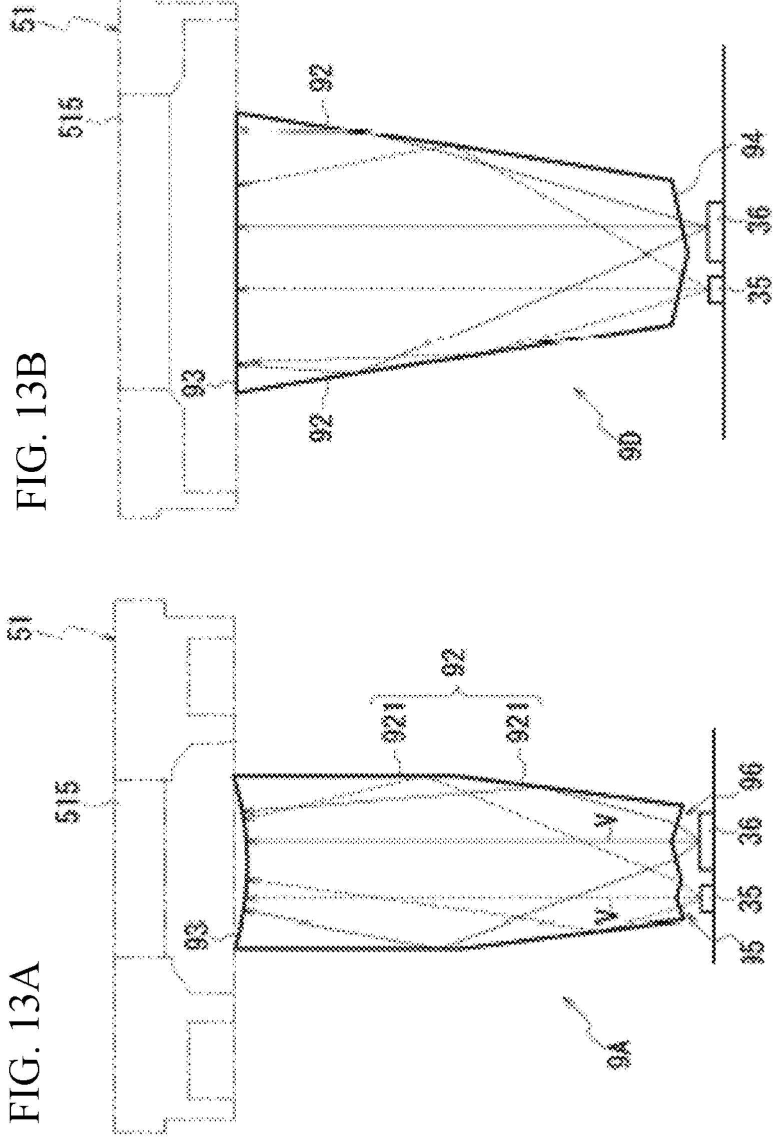
FIGS. 13A and 13B are diagrams illustrating the operations of light guides.

FIG. 13A shows the traveling paths of the light that has entered the light guide 9A, that is, the traveling paths of the light emitted from the light source 35 and the traveling paths of the light emitted from the light source 36.

FIG. 13B shows the traveling paths of the light that has entered the light guide 9D, that is, the traveling paths of the light emitted from the light source 35 and the traveling paths of the light emitted from the light source 36.

Figures 14A, 14B, 14C, 14D:
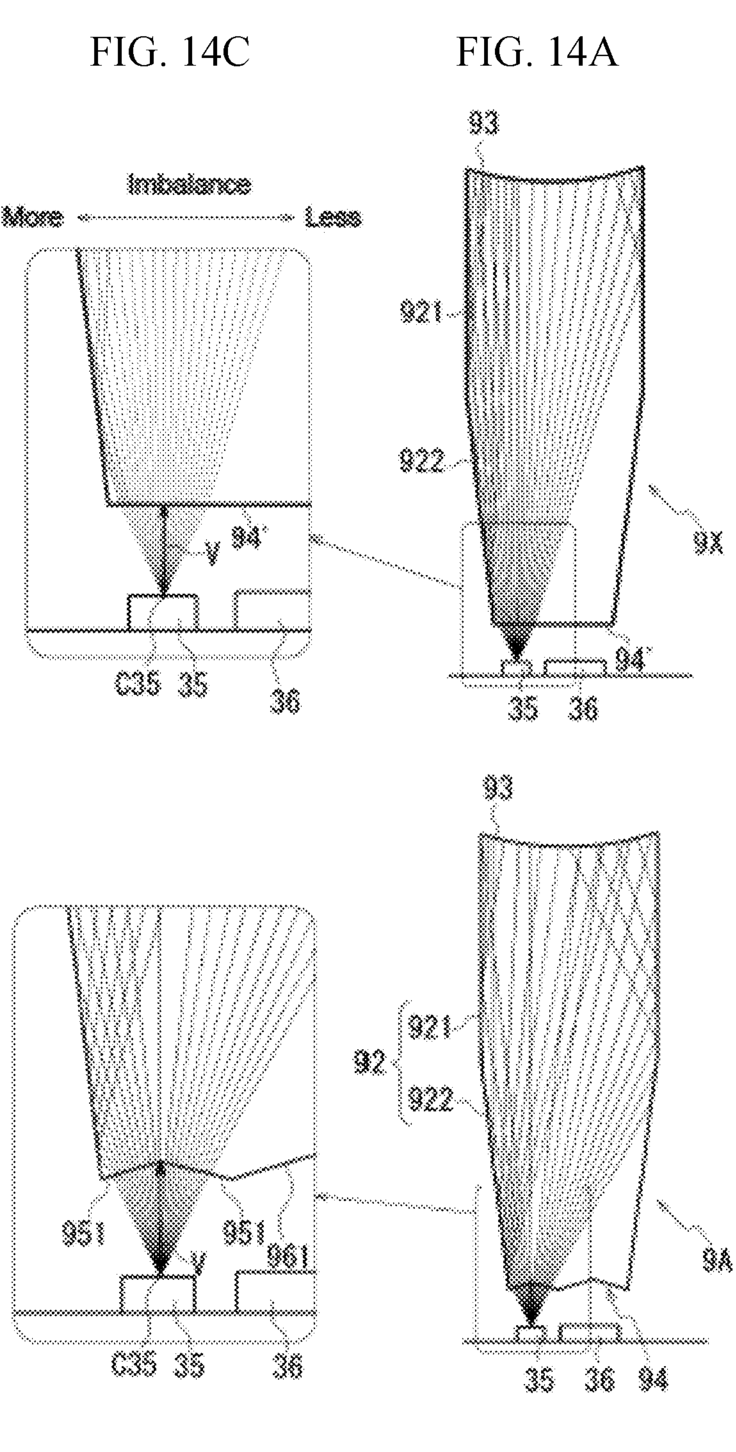
FIGS. 14A and 14B are diagrams illustrating the operations of light guides.
FIGS. 14C and 14D are enlarged views of the diagrams of FIGS. 14A and 14B, respectively.

FIG. 14A shows the traveling paths of the light that has entered a light guide 9X having a flat surface as a light receiving surface 94'. FIG. 14B shows the traveling paths of the light that has entered the light guide 9A.

As shown in FIG. 3, when the operable portion 51 of the switch 5A is pressed, the movable member 6 is displaced downward toward the printed circuit board 34 in synchronization with the displacement of the operable portion 51.

This brings the mount portions 82 of the cover member 8 pressed by the contact portion 62 of the movable member 6 into contact with the upper surface 34*a* of the printed circuit board 34. The switch 5A is thus turned on, and light is emitted from one of the light sources 35 and 36 upward toward the light guide 9A.

[Light Guide 9A]

As shown in FIGS. 8A and 8B, as for the switch 5A, the depression 95 of the light guide 9A is located above the light source 35. When viewed in the opposing direction of the light guide 9A and the light source 35 (Z direction), the pair of inclined surfaces 951 and 951 are adjacent to each other in the arrangement direction of the light sources 35 and 36 (X direction).

The light guide 9A is positioned such that the boundary line Ca between the two inclined surfaces 951 and 951 is located at a position overlapping the light emitting surface 35*a* of the light source 35, more preferably at a position intersecting the center C35 of the light emitting surface 35*a*.

Here, the light emitted from the light source 35 travels from the center of the light emitting surface 35*a* in a direction perpendicular to the light emitting surface 35*a* (the direction of the reference line V in the figure) (see FIG. 8A).

At this time, the light emitted from the light source 35 is diffused to the surroundings while traveling along the reference line V.

The pair of inclined surfaces 951 and 951 are provided in a symmetrical positional relationship with respect to the boundary line Ca, and the inclined surfaces 951 and 951 are provided so as to cross the traveling direction of the light emitted from the light source 35. As such, substantially all the light emitted from the light source 35 enters the light guide 9A from the inclined surfaces 951 and 951 of the depression 95.

Similarly, when light is emitted from the light source 36 of the switch 5A, the depression 96 of the light guide 9A is located above the light source 36. When viewed in the opposing direction of the light guide 9A and the light source 36 (Z direction), the pair of inclined surfaces 961 and 961 are adjacent to each other in the arrangement direction of the light sources 35 and 36 (X direction) (see FIG. 8A).

The light guide 9A is positioned such that the boundary line Cb between the two inclined surfaces 961 and 961 is located at a position overlapping the light emitting surface 36*a* of the light source 36, more preferably at a position intersecting the center C36 of the light emitting surface 36*a*.

Thus, the pair of inclined surfaces 961 and 961 are provided so as to cross the traveling direction of the light emitted from the light source 36. As such, substantially all the light emitted from the light source 36 enters the light guide 9A from the inclined surfaces 961 and 961 of the depression 96.

As shown in FIGS. 13A and 14B, the light entering the light guide 9A from the depressions 95 and 96 is reflected within the light guide 9A while traveling to the upper side where the light emitting surface 93 is located.

With the light guide 9A, the inclination angles of the inclined surfaces 961 and 962 with respect to the light emitting surfaces 35*a* and 36*a* of the light sources 35 and 36 are adjusted to allow the traveling direction of the entering light to be dispersed within the light guide 9A. The traveling direction of the light emitted from the light emitting surface 93 of the light guide 9A is controlled while limiting an imbalance of the emitted light.

Also, the light emitting surface 93 is formed in a curved shape that curves away from the illumination section 515 and is recessed toward the light receiving surface 94. Accordingly, the light diffused within the light guide 9A is concentrated when passing through the light emitting surface 93, so that the illumination section 515 of the operable portion 51 can be illuminated with high brightness.

As a result, in the operable portion 51 of the switch 5A, a sufficient luminance can be ensured while limiting unevenness in brightness of the illumination section 515 illuminated by the light from the light guide 9A.

With the switches 5B and 5C having the light guides 9B and 9C of the same basic configuration as the light guide 9A, a sufficient luminance can also be ensured while limiting unevenness in brightness of the illumination section 515.

In contrast, as shown in FIG. 14A, with the light guide 9X having the flat light receiving surface 94', the light entering the light guide 9X gathers more on one side in the width direction, because the light sources 35 and 36 are arranged side by side. In the configuration of FIG. 14A, of the light emitted from the center of the light source 35, the light that is diffused in the region on the right side of the reference line V is diffused within the light guide 9X. In contrast, the light diffused in the region on the left side of the reference line V gathers more on the left side of the light guide 9X.

This is because the light source 35 is positioned closer to the second side surface 922, and the light entering the region on the left side of the reference line V of the light guide 9A is reflected on the side surface 92 before being sufficiently diffused. This causes the light to be concentrated in the left region of the light emitting surface 93, resulting in irregularity in brightness of the illumination section 515.

As a result, the light reflected within the light guide 9X also gathers more on one side, resulting in an imbalance in the light emitted from the light emitting surface 93. This in turn causes an imbalance in brightness of the illumination section 515 illuminated from the light emitting surface 93 of the light guide 9X.

In contrast, as shown in FIG. 14B, the inclined surfaces 951 and 951 diffuse the light entering the light guide 9A, and the light in the region on the left side of the reference line V is reflected at positions closer to the light receiving surface 94. This desirably limits the concentration of light in the region on the left side of the reference line V, thereby reducing the irregularity in brightness of the illumination section 515.

When the light source that emits light is the light source 36, the inclined surfaces 961 and 961 also desirably limit the concentration of light in the region on the right side of the reference line V. As a result, irregularity in brightness of the illumination section 515 can be reduced.

[Light Guide 9D]

As shown in FIG. 13B, the light guide 9D has a greater width along the side surface 91 than the light guide 9A. The width increases from the light receiving surface 94 toward the light emitting surface 93. Thus, the light guide 9D has a greater width in the light emitting surface 93 than the light guide 9A.

The light guide 9D illustrates an example in which the light emitting surface 93 is a flat surface and the light receiving surface 94 consisting of a pair of inclined surfaces 941 and 942 is formed in a pointed shape protruding toward the light sources 35 and 36.

That is, the light guide 9D diffuses the light within the light guide 9D before it reaches the light emitting surface 93 simply by diffusing the incident light with the inclined surfaces 941 and 942.

Thus, the light guide 9D desirably limits concentration of light on one side of the reference line V and reduces the irregularity in brightness of the illumination section 515, while reducing the processing cost for providing depressions in the light receiving surface.

When it is possible to allow the light guide 9D to have a width in the arrangement direction of the light sources 35 and 36 that is sufficient to limit irregularity in brightness of the illumination section 515, the light guide 9D may have a flat light receiving surface 94 to further reduce the processing cost.

As described above, the switch device 1 according to this embodiment has the light emitting devices 11 of the following configuration.

(1) The light emitting device 11 includes:

at least two light sources 35 and 36 arranged side by side in a first direction; and a light guide 9 placed opposed to the light sources 35 and 36.

As viewed in an opposing direction of the light sources 35 and 36 and the light guide 9 (Z direction), a light receiving surface 94 of the light guide 9 overlaps light emitting surfaces 35*a* and 36*a* of the light sources 35 and 36.

As viewed in the opposing direction (Z direction), the light receiving surface 94 has depressions 95 and 96 in a region opposed to the light emitting surfaces 35*a* and 36*a* of the light sources 35 and 36.

The depressions 95 and 96 are arranged side by side in the arrangement direction of the light sources 35 and 36 (first direction) in a one-to-one correspondence with the light sources 35 and 36.

With this configuration, as viewed in the opposing direction (Z direction), the light sources 35 and 36 are arranged in such a positional relationship that the light sources 35 and 36 overlap the respective depressions 95 and 96 of the light receiving surface 94. Thus, the light emitted from the light sources 35 and 36 enters the light guide 9A from the depressions 95 and 96 provided in a one-to-one correspondence with the light sources 35 and 36. The traveling direction of the incident light can be adjusted by adjusting the shapes of the depressions 95 and 96, thereby limiting an imbalance of light before it reaches the light emitting surface 93 of the light guide 9A. This allows for the control of the traveling direction of the light emitted from the light emitting surface 93, thereby limiting unevenness in brightness of the section illuminated by the emitted light (the illumination section 515).

Additionally, since the depressions 95 and 96 are provided in a one-to-one correspondence with the light sources 35 and 36, the shapes of the depressions 95 and 96 can be adjusted according to the respective light sources 35 and 36 to obtain optimal light traveling directions. Thus, further limitation on unevenness in brightness can be expected.

(2) Each depression 95, 96 includes a pair of inclined surfaces 951, 951, 961, 961 whose distance d from the corresponding light source 35, 36 changes continuously in the arrangement direction of the light sources 35 and 36 (first direction).

The pair of the inclined surfaces 951 and 951 are connected to each other at a position overlapping the light emitting surface 35*a* of the light source 35 as viewed in the opposing direction.

The pair of the inclined surfaces 961 and 961 are connected to each other at a position overlapping the light emitting surface 36*a* of the light source 36 as viewed in the opposing direction.

As viewed in the opposing direction, a boundary line Ca at a connecting section of the pair of inclined surfaces 951 and 951 and a boundary line Cb at a connecting section of the pair of inclined surfaces 961 and 961 are perpendicular to the arrangement direction of the light sources 35 and 36 and at a maximum distance d from the respective light sources 35 and 36.

With this configuration, the traveling direction of the incident light can be adjusted by adjusting the inclination angles of the inclined surfaces 951 and 961 with respect to the light emitting surfaces 35*a* and 36*a* of the light sources 35 and 36. This allows for the control of the traveling direction of the light emitted from the light emitting surface 93 of the light guide 9 (the light guide 9A for the switch 5A). As a result, it is possible to limit unevenness in brightness of the section illuminated by the emitted light (illumination section 515).

(3) As viewed in the opposing direction, the boundary line Ca, Cb intersects a central portion (center C35, C36, see FIG. 8B) in the arrangement direction of the light sources 35 and 36 (first direction) of the light emitting surface 35*a*, 36*a* of the corresponding light source 35, 36.

The light emitted from the light source 35, 36 travels not only in a direction perpendicular to the light emitting surface 35*a*, 36*a* (direction of the reference line V, see FIG. 8A), or the opposing direction of the light sources 35 and 36 and the light guide 9, but also in directions inclined with respect to the light emitting direction. Accordingly, as viewed in the opposing direction of the light sources 35 and 36 and the light guide 9, the region of emitted light expands as it travels away from the light emitting surface 35*a*, 36*a*.

The above configuration allows the light that is diffused from the central portion of the light emitting surface 35*a*, 36*a* of the light source 35, 36 and is diffused around the reference line V to be appropriately received by the pair of inclined surfaces 951, 951, 961, 961 of the depression 95, 96.

This increases the amount of light entering the light guide 9 after being emitted from the light sources 35 and 36, thereby increasing the amount light emitted from the light guide 9. Accordingly, an improvement in the brightness of the illumination section 515 can be expected.

(4) The inclined surface 951 (the right inclined surface 951 in FIG. 8A) located on a first side in the arrangement direction of the light sources 35 and 36 (first direction) in the depression 95 on a second side in the arrangement direction (first direction) connects to the inclined surface 961 (the left inclined surface 961 in FIG. 8A) located on the second side in the arrangement direction (first direction) in the depression 96 on the first side in the arrangement direction (first direction).

With this configuration, the light receiving surface 94 is formed in an uneven shape in which the distance from the light source 35, 36 changes continuously in the arrangement direction of the light sources 35 and 36 (first direction). This allows the areas of the inclined surfaces 951 and 961 to be increased as compared to a configuration in which the entire light receiving surface 94 is flat, thereby ensuring a sufficient amount of the light received after being emitted from the light sources 35 and 36.

When a flat surface parallel to the light emitting surfaces 35*a* and 36*a* of the light sources 35 and 36 is left at the boundary between the depression 95 on one side in the arrangement direction and the depression 96 on the other side, it is difficult to control the traveling direction of the light entering from this flat surface. By forming the section of the light guide 9 that is opposed to the light sources 35 and 36 such that only the inclined surfaces 951 and 961 forming the depressions 95 and 96 are present in this section, it is possible to cause most of the light emitted from the light sources 35 and 36 to enter the light guide 9, to limit an imbalance of the light that has entered, and to emit the light in a desired direction.

(5) An operable portion 51 (operator) including an illumination section 515 is provided.

The light emitting surface 93 of the light guide 9 is placed opposed to the illumination section 515.

In cross-sectional view taken along the opposing direction of the light emitting surface 93 of the light guide 9 and the illumination section 515, the light emitting surface 93 of the light guide 9 has a curved shape curved in a direction away from the illumination section 515.

This configuration allows the light emitted from the light emitting surface 93 of the light guide 9 to be concentrated on the illumination section 515, thereby ensuring sufficient brightness of the illumination section 515.

(6) The light sources 35 and 36 are two light sources that are arranged side by side in the arrangement direction of the light sources 35 and 36 (first direction) and emit light of different colors.

This configuration allows the color of the light applied to the illumination section 515 to be changed, so that an improvement in the lighting effect of the illumination section 515 can be expected. As a result, even when two light sources with different luminances, areas, and arrangement positions are provided for one illumination section 515, it is possible to limit unevenness in brightness of the illumination section 515.

(7) At least a partial region of the depression 96 that is opposed to one light source 36 of the two light sources 35 and 36 has a surface that has been subjected to light diffusion processing.

For example, when the inclined surfaces have been subjected to light diffusion processing such as texturing, the amount of light entering the light guide can be adjusted.

When two light sources of different colors are arranged side by side, the brightness of the light actually emitted from each light source needs to match the brightness required for the light source. The above configuration allows for easy adjustment for the brightness required for each light source.

The present invention may be implemented as a switch device 1.

(8) The switch device 1 includes:

operable portions 51 (operators) of switches 5 (5A to 5D); and light emitting devices 11 configured to illuminate illumination sections 515 of the operable portions 51.

The operable portions 51 is configured to be operated by a user.

Mutually different functions are assigned to the pressing operation on the operable portion 51 (first operator) of the switch 5A and the pressing operation on the operable portion 51 (second operator) of the switch 5D.

The illumination section 515 of the operable portion 51 (second operator) of the switch 5D has a larger area than the illumination section 515 of the operable portion 51 of the switch 5A.

The light emitting device 11 includes:

two light sources 35 and 36 arranged side by side; and one light guide 9 placed opposed to the two light sources 35 and 36.

The light emitting devices 11 are arranged in a one-to-one correspondence with the operable portions 51.

In the light emitting device 11 of the switch 5A, the surface of the light guide 9A that is opposed to the light sources 35 and 36 has depressions 95 and 96 each including a pair of inclined surfaces 951, 951, 961, 961 whose distance d from the light source 35, 36 changes continuously in the arrangement direction of the light sources 35 and 36, and the depressions 95 and 96 are arranged side by side in the arrangement direction of the light sources 35 and 36 (first direction, the X direction in FIG. 8) in a one-to-one correspondence with the light sources 35 and 36.

In the light emitting device 11 of the switch 5D, the surface of the light guide 9D that is opposed to the light sources 35 and 36 is free of a depression similar to that of the light guide 9A.

With this configuration, as for the operable portion 51 of the switch 5A, which has the illumination section 515 of a smaller area, the light emitted from the light sources 35 and 36 enters the light guide 9A from the depressions 95 and 96 provided in a one-to-one correspondence with the light sources 35 and 36. The traveling direction of the incident light can be adjusted by adjusting the shapes of the depressions 95 and 96, thereby controlling the traveling direction of the light emitted from the light emitting surface 93 of the light guide 9A. As a result, it is possible to limit unevenness in brightness of the section illuminated by the emitted light.

As for the operable portion 51 of the switch 5D, which has the illumination section 515 of a larger area than that of the switch 5A, the large width of the light guide 9D limits unevenness in brightness of the illumination section, thereby reducing the processing cost for providing depressions.

In the above-described embodiment, a configuration having two light sources arranged side by side has been described as an example, but the number of light sources may be three or more. In this case, in the light receiving surface of the light guide, the same number of depressions as the light sources are provided continuously in the arrangement direction of the light sources.

For example, when three types of light sources, R (red), G (green), and B (blue), are used, the amount of light emitted from each light source can be adjusted to illuminate the illumination section with the desired color.

Although the embodiments and modifications of the present invention have been described above, the present invention is not limited to these, and can be appropriately modified within the scope of the technical idea of the invention.

DESCRIPTION OF REFERENCE NUMERALS AND SIGNS

1: switch device
2: case
211: first wall portion
212: second wall portion
213: engagement portion
3: cover
5 (5A to 5D): switch
51: operable portion (operator)
510: pressing target portion
515: illumination section
6: movable member
7: magnetic force sensor
8: cover member
81: base portion
82: mount portion
83: housing portion
84: light transmitting region
9 (9A to 9D, 9X): light guide
10: magnet
11: light emitting device
34: printed circuit board
35, 36: light source
35*a*, 36*b*: light emitting surface
91, 91*a*, 91*b*: side surface
92, 92*a*, 92*b*: side surface
93: light emitting surface
94: light receiving surface
95: depression
96: depression
97, 98: retention tab
910, 920: boundary point
911, 921: first side surface
912, 922: second side surface
941, 942: inclined surface
951, 952: inclined surface
961, 962: inclined surface
C35, C36: center
C9: center line
Ca, Cb, Cx: boundary line
d: distance

What is claimed is:

1. A light emitting device comprising:

at least two light sources arranged side by side in a first direction; and a light guide placed opposed to the light sources, wherein:

as viewed in an opposing direction of the at least two light sources and the light guide, a light receiving surface of the light guide overlaps light emitting surfaces of the at least two light sources, as viewed in the opposing direction, the light receiving surface has depressions in a region opposed to the light emitting surfaces of the at least two light sources, the depressions are arranged side by side in the first direction in a one-to-one correspondence with the at least two light sources, each depression includes a pair of inclined surfaces whose distance from a corresponding light source changes continuously in the first direction, the pair of the inclined surfaces are connected to each other at a position overlapping a light emitting surface of the corresponding light source as viewed in the opposing direction, and as viewed in the opposing direction, a boundary line at a connecting section of the pair of inclined surfaces is perpendicular to the first direction and at a maximum distance from the corresponding light source.

2. The light emitting device according to claim 1, wherein as viewed in the opposing direction, the boundary line intersects a central portion in the first direction of the light emitting surface of the corresponding light source.

3. The light emitting device according to claim 1, wherein the inclined surface located on a first side in the first direction in the depression on a second side in the first direction connects to the inclined surface located on the second side in the first direction in the depression on the first side in the first direction.

4. The light emitting device according to claim 1, further comprising:

an operator including an illumination section, wherein the light emitting surface of the light guide is placed opposed to the illumination section, and in a cross-sectional view taken in an opposing direction of the light emitting surface of the light guide and the illumination section, the light emitting surface of the light guide has a curved shape curved in a direction away from the illumination section.

5. The light emitting device according to claim 1, wherein the at least two light sources are two light sources that are arranged in the first direction and configured to emit light of different colors.

6. The light emitting device according to claim 5, wherein at least a partial region of the depression that is opposed to one of the two light sources has a surface that has been subjected to light diffusion processing.

7. The light emitting device according to claim 6, wherein the light diffusion processing is texturing.

8. A switch device comprising:

operators configured to be operated by a user;

light emitting devices configured to illuminate illumination sections of the operators, wherein the operators includes a first operator and a second operator having a larger area in the illumination section than the first operator, mutually different functions are assigned to the first operator and the second operator, the light emitting devices are provided in a one-to-one correspondence with the operators, each light emitting device includes:

two light sources arranged side by side; and one light guide placed opposed to the two light sources, in the light emitting device for the first operator, a surface of the light guide that is opposed to the light sources has depressions each including a pair of inclined surfaces whose distance from a corresponding light source changes continuously in an arrangement direction of the light sources, and the depressions are arranged side by side in the arrangement direction of the light sources in a one-to-one correspondence with the light sources, and in the light emitting device for the second operator, a surface of the light guide that is opposed to the corresponding light sources is free of a depression.

* * * * *